(12) United States Patent
Sayfan et al.

(10) Patent No.: US 8,175,985 B2
(45) Date of Patent: May 8, 2012

(54) PLUGIN INFRASTRUCTURE FOR HIERARCHICAL TEMPORAL MEMORY (HTM) SYSTEM

(75) Inventors: Giyora Sayfan, Davis, CA (US);
Subutai Ahmad, Palo Alto, CA (US);
Charles Curry, Fremont, CA (US)

(73) Assignee: Numenta, Inc., Redwood City, CA (US)

( * ) Notice: Subject to any disclaimer, the term of this patent is extended or adjusted under 35 U.S.C. 154(b) by 702 days.

(21) Appl. No.: 12/402,261

(22) Filed: Mar. 11, 2009

(65) Prior Publication Data
US 2009/0240886 A1    Sep. 24, 2009

Related U.S. Application Data

(60) Provisional application No. 61/037,707, filed on Mar. 19, 2008.

(51) Int. Cl.
*G06F 15/18* (2006.01)
*G06F 12/08* (2006.01)
*G06F 3/048* (2006.01)

(52) U.S. Cl. .......................... 706/12; 711/117
(58) Field of Classification Search .................... 706/12; 711/117
See application file for complete search history.

(56) References Cited

U.S. PATENT DOCUMENTS

| | | | |
|---|---|---|---|
| 4,766,534 A | 8/1988 | DeBenedictis | |
| 4,845,744 A | 7/1989 | DeBenedictis | |
| 5,255,348 A | 10/1993 | Nenov | |
| 5,712,953 A | 1/1998 | Langs | |
| 6,122,014 A | 9/2000 | Panusopone et al. | |
| 6,195,622 B1 | 2/2001 | Altschuler et al. | |
| 6,400,996 B1 | 6/2002 | Hoffberg et al. | |
| 6,468,069 B2 | 10/2002 | Lemelson et al. | |
| 6,567,814 B1 | 5/2003 | Banker et al. | |

(Continued)

FOREIGN PATENT DOCUMENTS
EP    1557990 A    7/2005
(Continued)

OTHER PUBLICATIONS

Dean, T., "Learning Invariant Features Using Inertial Priors," *Annals of Mathematics and Artificial Intelligence*, 2006, pp. 223-250, vol. 47.

(Continued)

*Primary Examiner* — Jeffrey A Gaffin
*Assistant Examiner* — Ola Olude Afolabi
(74) *Attorney, Agent, or Firm* — Fenwick & West LLP

(57) ABSTRACT

A system for implementing a hierarchical temporal memory (HTM) network using a plugin infrastructure. The plugin infrastructure registers the plugins to be used in instantiating the HTM network. The plugin may include one or more functions for creating one or more components of the HTM network in a runtime engine. The plugin is associated with a component specification describing the components of the HTM network created by invoking the functions of the plugin. After the plugin is registered, the plugin infrastructure allows functions of the plugin to be invoked to instantiate The HTM network on a runtime engine. After the HTM network is instantiated, the runtime engine may run the instance of the HTM network to learn and infer the causes of input data. The system may also include one or more external programs to provide various supporting operations associated with the runtime engine by referencing the component specification. The supporting operations that can be performed by the external programs include, among others, validating a netlist defining the structure of the HTM network, build help information for the component, and generating a graphical user interface associated with the HTM network.

20 Claims, 8 Drawing Sheets

U.S. PATENT DOCUMENTS

| | | | |
|---|---|---|---|
| 6,625,585 | B1 | 9/2003 | MacCuish et al. |
| 6,714,941 | B1 | 3/2004 | Lerman et al. |
| 6,751,343 | B1 | 6/2004 | Ferrell et al. |
| 6,957,241 | B2 | 10/2005 | George |
| 7,088,693 | B2 | 8/2006 | George |
| 7,251,637 | B1 | 7/2007 | Caid et al. |
| 7,739,208 | B2 | 6/2010 | George et al. |
| 7,826,990 | B2 | 11/2010 | Nasle et al. |
| 7,840,395 | B2 | 11/2010 | Nasle et al. |
| 7,840,396 | B2 | 11/2010 | Radibratovic et al. |
| 7,844,439 | B2 | 11/2010 | Nasle et al. |
| 7,844,440 | B2 | 11/2010 | Nasle et al. |
| 7,937,342 | B2 | 5/2011 | George et al. |
| 2002/0150044 | A1 | 10/2002 | Wu et al. |
| 2003/0069002 | A1 | 4/2003 | Hunter et al. |
| 2003/0123732 | A1 | 7/2003 | Miyazaki et al. |
| 2003/0167111 | A1 | 9/2003 | Kipersztok et al. |
| 2004/0002838 | A1 | 1/2004 | Oliver et al. |
| 2004/0148520 | A1 | 7/2004 | Talpade et al. |
| 2004/0267395 | A1 | 12/2004 | Discenzo et al. |
| 2005/0063565 | A1 | 3/2005 | Nagaoka et al. |
| 2005/0190990 | A1 | 9/2005 | Burt et al. |
| 2005/0222811 | A1 | 10/2005 | Jakobson et al. |
| 2006/0184462 | A1 | 8/2006 | Hawkins |
| 2006/0212444 | A1 | 9/2006 | Handman et al. |
| 2006/0235320 | A1 | 10/2006 | Tan et al. |
| 2006/0248026 | A1 | 11/2006 | Aoyama et al. |
| 2006/0248073 | A1 | 11/2006 | Jones et al. |
| 2006/0253491 | A1 | 11/2006 | Gokturk et al. |
| 2006/0259163 | A1 | 11/2006 | Hsiung et al. |
| 2007/0005531 | A1 | 1/2007 | George et al. |
| 2007/0192264 | A1 | 8/2007 | Hawkins et al. |
| 2007/0192267 | A1 | 8/2007 | Hawkins et al. |
| 2007/0192268 | A1 | 8/2007 | Hawkins et al. |
| 2007/0192269 | A1 | 8/2007 | Saphir et al. |
| 2007/0192270 | A1 | 8/2007 | Hawkins et al. |
| 2007/0228703 | A1 | 10/2007 | Breed |
| 2007/0276774 | A1 | 11/2007 | Ahmad et al. |
| 2008/0059389 | A1 | 3/2008 | Jaros et al. |
| 2009/0006289 | A1 | 1/2009 | Jaros et al. |
| 2010/0207754 | A1 | 8/2010 | Shostak et al. |

FOREIGN PATENT DOCUMENTS

| | | |
|---|---|---|
| WO | WO 2006/063291 A | 6/2006 |
| WO | WO 2008/067326 A2 | 6/2008 |
| WO | WO 2009/006231 A | 1/2009 |

OTHER PUBLICATIONS

Adelson, E.H. et al., "The Perception of Shading and Reflectance," Perception as Bayesian Inference, Knill, D.C. et al., ed., 1996, pp. 409-423, Cambridge University Press, UK.

Agrawal, R. et al., "Mining Sequential Patterns," IEEE, 1995, pp. 3-14.

Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008] Retrieved from the Internet<URL:http://web.archive.org/web/20070319232606/http://www.numenta.com/for-developers/software/pdf/nupic_prog_guide.pdf>.

Becerra, J.A. et al., "Multimodule Artificial Neural Network Architectures for Autonomous Robot Control Through Behavior Modulation," IWANN 2003, LNCS, J. Mira (Ed.), pp. 169-176, vol. 2687, Springer-Verlag.

Csapo, A.B. et al., "Object Categorization Using VFA-Generated Nodemaps and Hierarchical Temporal Memories," IEEE International Conference on Computational Cybernetics, IEEE, Oct. 7, 2007, pp. 257-262.

Demeris, Y. et al., "From Motor Babbling to Hierarchical Learning by Imitation: A Robot Developmental Pathway," Proceedings of the Fifth International Workshop on Epigenetic Robotics: Modeling Cognitive Development in Robotic Systems, 2005, pp. 31-37.

Ding, C.H.Q., "Cluster Merging and Splitting in Hierarchical Clustering Algorithms," Proceedings of the 2002 IEEE International Conference on Data Mining (ICDM 2002), Dec. 9, 2002, pp. 139-146.

European Examination Report, European Application No. 05853611.1, Jun. 23, 2008, 4 pages.

European Examination Report, European Application No. 07750385.2, Apr. 21, 2009, 8 pages.

Felleman, D.J. et al., "Distributed Hierarchical Processing in the Primate Cerebral Cortex," Cerebral Cortex, Jan./Feb. 1991, pp. 1-47, vol. 1.

Fine, S. et al., "The Hierarchical Hidden Markov Model: Analysis and Applications," Machine Learning, Jul. 1998, pp. 41-62, vol. 32.

Foldiak, P., "Learning Invariance from Transformation Sequences," Neural Computation, 1991, pp. 194-200, vol. 3, No. 2.

Fukushima, K., "Neocognitron: A Self-Organizing Neural Network Model for a Mechanism of Pattern Recognition Unaffected by Shift in Position," Biol. Cybernetics, 1980, pp. 193-202, vol. 36.

George, D. et al., "A Hierarchical Bayesian Model of Invariant Pattern Recognition in the Visual Cortex," Mar. 2005.

George, D. et al., "Invariant Pattern Recognition Using Bayesian Inference on Hierarchical Sequences," Technical Report, Oct. 2004, pp. 1-8.

George, D. et al., "A Hierarchical Bayesian Model of Invariant Pattern Recognition in the Visual Cortex," Proceedings, 2005 IEEE International Joint Conference on Neural Networks, Jul. 31-Aug. 4, 2005, pp. 1812-1817, vol. 3.

Gottschalk, K. et al., "Introduction to Web Services Architecture," IBM Systems Journal, 2002, pp. 170-177, vol. 41, No. 2.

Guinea, D. et al., "Robot Learning to Walk: An Architectural Problem for Intelligent Controllers," Proceedings of the 1993 International Symposium on Intelligent Control, Chicago, IL, IEEE, Aug. 1993, pp. 493-498.

Guo, C-E. et al., "Modeling Visual Patterns by Integrating Descriptive and Generative Methods," International Journal of Computer Vision, May 29, 2003, 28 pages, vol. 53, No. 1.

Han, K. et al., "Automated Robot Behavior Recognition Applied to Robotic Soccer," In Proceedings of the IJCAI-99 Workshop on Team Behaviors and Plan Recognition, 1999, 6 pages.

Hasegawa, Y. et al., "Learning Method for Hierarchical Behavior Controller," Proceedings of the 1999 IEEE International Conference on Robotics & Automation, May 1999, pp. 2799-2804.

Hawkins, J. et al., "Hierarchical Temporal Memory Concepts, Theory and Terminology," Numenta, Jan. 27, 2007, pp. 1-20.

Hawkins, J. et al., "Hierarchical Temporal Memory Concepts, Theory and Terminology," Numenta, Mar. 27, 2007 [Online] [Retrieved on Oct. 7, 2008] Retrieved from the Internet<URL:http://www.numenta.com/Numenta_HTM_Concepts.pdf>.

Hawkins, J. et al., "Hierarchical Temporal Memory Concepts, Theory and Terminology," Numenta, May 10, 2006 [Online] [Retrieved on Jul. 16, 2008] Retrieved from the Internet<URL:http://www.neurosecurity.com/whitepapers/Numenta_HTM_Concepts.pdf>.

Hawkins, J. et al., "On Intelligence," Sep. 2004, pp. 23-29, 106-174, 207-232, Times Books, Henry Holt and Company, New York, NY 10011.

Hawkins, J., "Why Can't a Computer be More Like a Brain?" IEEE Spectrum, Apr. 1, 2007, pp. 21-26, vol. 44, No. 4, IEEE Inc., New York, US.

Hernandez-Gardiol, N. et al., "Hierarchical Memory-Based Reinforcement Learning," Proceedings of Neural Information Processing Systems, 2001, 7 pages.

Hinton, G.E. et al., "The "Wake-Sleep" Algorithm for Unsupervised Neural Networks," Science, May 26, 1995, pp. 1158-116, vol. 268.

Hoey, J., "Hierarchical Unsupervised Learning of Facial Expression Categories," 2001, IEEE, 0-7695-1293-3, pp. 99-106.

Hyvarinen, A. et al., "Bubbles: A Unifying Framework for Low-Level Statistical Properties of Natural Image Sequences," J. Opt. Soc. Am. A., 2003, pp. 1237-1252, vol. 20, No. 7.

International Search Report and Written Opinion, International Application No. PCT/US2007/003544, Jun. 16, 2008, 14 pages.

International Search Report and Written Opinion, International Application No. PCT/US2005/044729, May 14, 2007, 14 pages.

International Search Report and Written Opinion, International Application No. PCT/US07/85661, Jun. 13, 2008, 7 pages.

International Search Report and Written Opinion, International Application No. PCT/US08/55389, Jul. 25, 2008, 8 pages.

International Search Report and Written Opinion, International Application No. PCT/US08/55352, Aug. 1, 2008, 8 pages.
International Search Report and Written Opinion, International Application No. PCT/US2008/054631, Aug. 18, 2008, 14 pages.
International Search Report and Written Opinion, International Application No. PCT/US2008/068435, Oct. 31, 2008, 14 pages.
International Search Report and Written Opinion, International Application No. PCT/US2009/035193, Apr. 22, 2009, 14 pages.
Isard, M. et al., "ICONDENSATION: Unifying Low-Level and High-Level Tracking in a Stochastic Framework," Lecture Notes in Computer Science 1406, Burkhardt, H. et al., ed., 1998, pp. 893-908, Springer-Verlag, Berlin.
Lee, T.S. et al., "Hierarchical Bayesian Inference in the Visual Cortex," Journal of the Optical Society of America, Opt. Image. Sci. Vis., Jul. 7, 2003, pp. 1434-1448, vol. 20, No. 7.
Lenser, S. et al., "A Modular Hierarchical Behavior-Based Architecture," RoboCup 2001, LNAI 2377, 2002, Birk, A. et al, (Eds.), pp. 423-428, Springer-Verlag, Berlin, Heidelberg.
Lewicki, M.S. et al., "Bayesian Unsupervised Learning of Higher Order Structure," Moser, M.C. et al., ed., Proceedings of the 1996 Conference in Advances in Neural Information Processing Systems 9, 1997, pp. 529-535.
Murphy, K. et al., "Using the Forest to See the Trees: A Graphical Model Relating Features, Objects and Scenes," Advances in Neural Processing System, 2004, vol. 16.
Murray, S.O. et al., "Shaper Perception Reduces Activity in Human Primary Visual Cortex," Proceedings of the Nat. Acad. of Sciences of the USA, Nov. 2002, pp. 15164-151169, vol. 99, No. 23.
"Numenta Node Algorithms Guide NuPIC 1.6," Numenta, Jun. 13, 2008, pp. 1-6.
"Numenta Node Algorithms Guide NuPIC 1.6," Numenta, Jul. 22, 2008, pp. 1-7.
Olshausen, B.A. et al., "A Neurobiological Model of Visual Attention and Invariant Pattern Recognition Based on Dynamic Routing Information," Jnl. of Neuroscience, Nov. 1993.
Pearl, J., "Probabilistic Reasoning in Intelligent Systems: Networks of Plausible Inference," 1988, pp. 143-223, Morgan Kaufmann Publishers, Inc.
Riesenhuber, M. et al., "Hierarchical Models of Object Recognition in Cortex," Nature Neuroscience, Nov. 1999, pp. 1019-1025, vol. 2, No. 11.
Sinha, P. et al., "Recovering Reflectance and Illumination in a World of Painted Polyhedra," Fourth International Conference on Computer Vision, Berlin, May 11-14, 1993, pp. 156-163, IEEE Computer Society Press, Los Alamitos, CA.
Stringer, S.M. et al., "Invariant Object Recognition in the Visual System with Novel Views of 3D Objects," Neural Computation, Nov. 2002, pp. 2585-2596, vol. 14, No. 11.
Sudderth, E.B. et al., "Nonparametric Belief Propagation and Facial Appearance Estimation," AI Memo 2002-020, Dec. 2002, pp. 1-10, Artificial Intelligence Laboratory, Massachusetts Institute of Technology, Cambridge, MA.
Thomson, A.M. et al., "Interlaminar Connections in the Neocortex," Cerebral Cortex, 2003, pp. 5-14, vol. 13, No. 1.
Tsukada, M, "A Theoretical Model of the Hippocampal-Cortical Memory System Motivated by Physiological Functions in the Hippocampus", Proceedings of the 1993 International Joint Conference on Neural Networks, Oct. 25, 1993, pp. 1120-1123, vol. 2, Japan.
Van Essen, D.C. et al., "Information Processing Strategies and Pathways in the Primate Visual System," An Introduction to Neural and Electronic Networks, 1995, $2^{nd}$ ed.
Vlajic, N. et al., "Vector Quantization of Images Using Modified Adaptive Resonance Algorithm for Hierarchical Clustering", IEEE Transactions on Neural Networks, Sep. 2001, pp. 1147-1162, vol. 12, No. 5.
Wiskott, L. et al., "Slow Feature Analysis: Unsupervised Learning of Invariances," Neural Computation, 2002, pp. 715-770, vol. 14, No. 4.
Yedidia, J.S. et al., "Understanding Belief Propagation and its Generalizations," Joint Conference on Artificial Intelligence (IJCAI 2001), Seattle, WA, Aug. 4-10, 2001, 35 pages.
Zemel, R.S., "Cortical Belief Networks," Computational Models for Neuroscience, Hecht-Nielsen, R. et al., ed., 2003, pp. 267-287, Springer-Verlag, New York.

"Zeta1 Algorithms Reference, Version 1.0," Numenta Inc., Mar. 1, 2007, pp. 1-36.
"Zeta1 Algorithms Reference, Version 1.2," Numenta Inc., Jun. 8, 2007, pp. 1-38.
"Zeta1 Algorithms Reference, Version 1.3," Numenta Inc., Aug. 22, 2007, pp. 1-41.
"Zeta1 Algorithms Reference, Version 1.5," Numenta Inc., Aug. 24, 2007, pp. 1-45.
Colombe, J., "A Survey of Recent Developments in Theoretical Neuroscience and Machine Vision," Proceedings of the IEEE Applied Imagery Pattern Recognition Workshop, 2003, nine pages.
Farahmand, N. et al., "Online Temporal Pattern Learning," Proceedings of the International Joint Conference on Neural Networks, Jun. 14-19, 2009, pp. 797-802, Atlanta, GA, USA.
Lo, J. "Unsupervised Hebbian Learning by Recurrent Multilayer Neural Networks for Temporal Hierarchical Pattern Recognition," Information Sciences and Systems $44^{th}$ Annual Conference on Digital Object Identifier, 2010, pp. 1-6.
Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.
Nair, D. et al., "Bayesian Recognition of Targets by Parts in Second Generation Forward Looking Infrared Images," Image and Vision Computing, 2000, pp. 849-864, vol. 18.
Namphol, A. et al., "Image Compression with a Hierarchical Neural Network," IEEE transactions on Aerospace and Electronic Systems, Jan. 1996, pp. 326-338, vol. 32, No. 1.
Naphade, M. et al., "A Probabilistic Framework for Semantic Video Indexing, Filtering, and Retrieval," IEEE Transactions on Multimedia, Mar. 2001, pp. 141-151, vol. 3, No. 1.
Rao, R. et al., "Predictive Coding in the Visual Cortex: A Functional Interpretation of Some Extra-classical Receptive-field Effects," Nature Neuroscience, Jan. 1999, pp. 79-87, vol. 2, No. 1.
Spence, C. et al., "Varying Complexity in Tree-Structured Image Distribution Models," IEEE Transactions on Image Processing, Feb. 2006, pp. 319-330, vol. 15, No. 2.
Starzyk, J.A. et al., "Spatio-Temporal Memories for Machine Learning: A Long-Term Memory Organization," IEEE Transactions on Neural Networks, May 2009, pp. 768-780, vol. 20, No. 5.
Weiss, R. et al., "HyPursuit: A Hierarchical Network Search Engine that Exploits Content-Link Hypertext Clustering," Proceedings of the Seventh Annual ACM Conference on Hypertext, Mar. 16-20, 1996, pp. 180-193, Washington, D.C. USA.
Fine, S. et al., "The Hierarchical Hidden Markov Model: Analysis and Applications," Machine Learning, 1998, pp. 41-62, vol. 32, Kluwer Academic Publishers, Boston.
Kuenzer, A. et al., "An Empirical Study of Dynamic Bayesian Networks for User Modeling," Proc. of the UM 2001 Workshop on Machine Learning, pages.
Ahmad, S., "NuPIC Jumpstart—Part II," Numenta®, May 2008, Numenta HTM Workshop, Jun. 23-24, 2008, SRI Campus, Menlo Park, CA, 34 pages.
Ahmad, S. et al., "PowerNuPIC," Numenta®, Jun. 2008, Numenta HTM Workshop, Jun. 23-24, 2008, SRI Campus, Menlo Park, CA, 57 pages.
Biancaniello, P. et al., Multimodal Pattern Recognition with Hierarchical Temporal Memory (MPR), Lockheed Martin Brain-Inspired Computing Research Overview, Numenta HTM Workshop, Jun. 2008, 12 pages.
Bobier, B., "Content-Based Image Retrieval Using Hierarchical Temporal Memory," Numenta HTM Workshop, Jun. 23-24, 2008, SRI Campus, Menlo Park, CA, 7 pages.
Curry, C. et al., "Speech Processing with HTM," Numenta®, Jun. 2008, Numenta HTM Workshop, Jun. 23-24, 2008, SRI Campus, Menlo Park, CA, 57 pages.
Dubinsky, D., "Numenta Business Strategy," Numenta®, Jun. 2008, Numenta HTM Workshop, Jun. 23-24, 2008, SRI Campus, Menlo Park, CA, 15 pages.
"EDSA Project Information," Numenta®, Apr. 2008, Numenta HTM Workshop, Jun. 23-24, 2008, SRI Campus, Menlo Park, CA, 4 pages.

Eswaran, K., "Numenta Lightning Talk on Dimension Reduction and Unsupervised Learning," Numenta HTM Workshop, Jun. 23-24, 2008, SRI Campus, Menlo Park, CA, 30 pages.

Finley, M., "Exploration of Motion Capture," Qualia Labs, Jun. 24, 2008, Numenta HTM Workshop, Jun. 23-24, 2008, SRI Campus, Menlo Park, CA, 36 pages.

George, D. et al., "The HTM Learning Algorithm," [Online] [Retrieved on Jan. 1, 2009] Retrieved from the Internet<URL:http://www.numenta.com/for-developers/education/Numenta_HTM_Learning_Algos.pdf>.

Haitani, R. et al., "Vitamin D Toolkit, Introduction," Jun. 24, 2008, Numenta HTM Workshop, Jun. 23-24, 2008, SRI Campus, Menlo Park, CA, 11 pages.

"HTM Algorithms," Numenta®, Jun. 2008, Numenta HTM Workshop, Jun. 23-24, 2008, SRI Campus, Menlo Park, CA, 67 pages.

"HTM Optimized Drug Therapy," SDSytem24.com, Numenta HTM Workshop, Jun. 23-24, 2008, SRI Campus, Menlo Park, CA, 7 pages.

"HTM Workshop, Jumpstart," Numenta®, Jun. 2008, Numenta HTM Workshop, Jun. 23-24, 2008, SRI Campus, Menlo Park, CA, 86 pages.

Levinson, S. et al., "Automatic Language Acquisition for a Mobile Robot," Feb. 2005, Numenta HTM Workshop, Jun. 23-24, 2008, SRI Campus, Menlo Park, CA, 27 pages.

McDowell, C. et al., "SlugGo, a Computer Go Program," Numenta HTM Workshop, Jun. 23-24, 2008, SRI Campus, Menlo Park, CA, 18 pages.

PCT International Search Report and Written Opinion, PCT Application No. PCT/US2009/047250, Sep. 25, 2009, 13 pages.

"Problem Solving with HTMs," Numenta®, Jun. 2008, Numenta HTM Workshop, Jun. 23-24, 2008, SRI Campus, Menlo Park, CA, 23 pages.

Ross, L., "Discovering and Using Patterns in Plant Floor Data," Numenta HTM Workshop, Jun. 23-24, 2008, SRI Campus, Menlo Park, CA, 12 pages.

Saphir, B., "Power NuPIC Part II, How to Create a New Node Type," Numenta®, Jun. 2008, Numenta HTM Workshop, Jun. 23-24, 2008, SRI Campus, Menlo Park, CA, 32 pages.

U.S. Office Action, U.S. Appl. No. 11/622,456, Mar. 20, 2009, 9 pages.

U.S. Office Action, U.S. Appl. No. 11/622,456, Nov. 6, 2008, 7 pages.

U.S. Office Action, U.S. Appl. No. 11/622,456, May 7, 2008, 14 pages.

U.S. Office Action, U.S. Appl. No. 11/622,454, Mar. 30, 2009, 11 pages.

U.S. Office Action, U.S. Appl. No. 11/622,454, Jun. 3, 2008, 13 pages.

U.S. Office Action, U.S. Appl. No. 11/622,457, Apr. 21, 2009, 6 pages.

U.S. Office Action, U.S. Appl. No. 11/622,457, Nov. 20, 2008, 8 pages.

U.S. Office Action, U.S. Appl. No. 11/622,457, May 6, 2008, 14 pages.

U.S. Office Action, U.S. Appl. No. 11/622,457, Aug. 24, 2007, 10 pages.

U.S. Office Action, U.S. Appl. No. 11/147,069, Jul. 29, 2009, 43 pages.

U.S. Office Action, U.S. Appl. No. 11/147,069, Jan. 9, 2009, 38 pages.

U.S. Office Action, U.S. Appl. No. 11/147,069, May 15, 2008, 37 pages.

U.S. Office Action, U.S. Appl. No. 11/147,069, Oct. 30, 2007, 34 pages.

U.S. Office Action, U.S. Appl. No. 11/147,069, May 29, 2007, 36 pages.

U.S. Office Action, U.S. Appl. No. 11/147,069, Jan. 9, 2007, 27 pages.

Vaught, T.N., "Software Design in Scientific Computing," Jun. 23, 2008, Numenta HTM Workshop, Jun. 23-24, 2008, SRI Campus, Menlo Park, CA, 32 pages.

"Vision Framework," Numenta®, Jun. 2008, Numenta HTM Workshop, Jun. 23-24, 2008, SRI Campus, Menlo Park, CA, 36 pages.

Dimitrova, N. et al., "Motion Recovery for Video Content Classification," ACM Transactions on Information Systems, Oct. 1995, pp. 408-439, vol. 13, No. 4.

Dolin, R. et al., "Scalable Collection Summarization and Selection," Association for Computing Machinery, 1999, pp. 49-58.

Guerrier, P., "A Generic Architecture for On-Chip Packet-Switched Interconnections," Association for Computing Machinery, 2000, pp. 250-256.

Kim, J. et al., "Hierarchical Distributed Genetic Algorithms: A Fuzzy Logic Controller Design Application," IEEE Expert, Jun. 1996, pp. 76-84.

Mishkin, M. et al., "Hierarchical Organization of Cognitive Memory," Phil. Trans. R. Soc. B., 1997, pp. 1461-1467, London.

Park, S. et al., "Recognition of Two-person Interactions Using a Hierarchical Bayesian Network," ACM SIGMM International Workshop on Video Surveillance (IWVS) 2003, pp. 65-76, Berkeley, USA.

Poppel, E., "A Hierarchical Model of Temporal Perception," Trends in Cognitive Sciences, May 1997, pp. 56-61, vol. 1, No. 2.

Tsinarakis, G.J. et al. "Modular Petri Net Based Modeling, Analysis and Synthesis of Dedicated Production Systems," Proceedings of the 2003 IEEE International Conference on Robotics and Automation, Sep. 14-19, 2003, pp. 3559-3564, Taipei, Taiwan.

Tsinarakis, G.J. et al. "Modular Petri Net Based Modeling, Analysis, Synthesis and Performance Evaluation of Random Topology Dedicated Production Systems," Journal of Intelligent Manufacturing, 2005, vol. 16, pp. 67-92.

United States Office Action, U.S. Appl. No. 11/680,197, Mar. 23, 2010, twelve pages.

United States Office Action, U.S. Appl. No. 11/713,157, Mar. 31, 2010, 14 pages.

United States Office Action, U.S. Appl. No. 11/622,458, Apr. 1, 2010, 16 pages.

United States Office Action, U.S. Appl. No. 11/622,455, Apr. 21, 2010, 12 pages.

Wu, G. et al., "Multi-camera Spatio-temporal Fusion and Biased Sequence-data Learning for Security Surveillance," Association for Computing Machinery, 2003, pp. 528-538.

European Patent Office Communication, European Patent Application No. 07750385.2, Dec. 6, 2010, eight pages.

European Patent Office Examination Report, European Patent Application No. 08796030.8, Dec. 6, 2010, seven pages.

Lim, K. et al., "Estimation of Occlusion and Dense Motion Fields in a Bidirectional Bayesian Framework," *IEEE Transactions on Pattern Analysis and Machine Intelligence*, May 2002, pp. 712-718, vol. 24, No. 5.

United States Office Action, U.S. Appl. No. 11/680,197, Sep. 14, 2010, seventeen pages.

PLUGIN INFRASTRUCTURE FOR HIERARCHICAL TEMPORAL MEMORY (HTM) SYSTEM

RELATED APPLICATIONS

This application claims priority under 35 U.S.C. §119(e) to U.S. Provisional Patent Application No. 61/037,707 entitled "Plugin Infrastructure for Hierarchical Temporal Memory (HTM) System," filed on Mar. 19, 2008, the subject matter of which is incorporated by reference herein in its entirety. This application is related to U.S. patent application Ser. No. 11/351,437 entitled "Architecture of a Hierarchical Temporal Memory Based System," filed on Feb. 10, 2006; U.S. patent application Ser. No. 11/622,458 entitled "Belief Propagation in a Hierarchical Temporal Memory Based System," filed on Jan. 11, 2007; U.S. patent application Ser. No. 11/622,447 entitled "Extensible Hierarchical Temporal Memory Based System," filed on Jan. 11, 2007; U.S. patent application Ser. No. 11/622,448 entitled "Directed Behavior Using a Hierarchical Temporal Memory Based System," filed on Jan. 11, 2007; U.S. patent application Ser. No. 11/622,457 entitled "Pooling in a Hierarchical Temporal Memory Based System" filed on Jan. 11, 2007; U.S. patent application Ser. No. 11/622,454 entitled "Sequence Learning in a Hierarchical Temporal Memory Based System," filed on Jan. 11, 2007; U.S. patent application Ser. No. 11/622,456 filed on Jan. 11, 2007; U.S. patent application Ser. No. 11/622,455 entitled "Message Passing in a Hierarchical Temporal Memory Based System," filed on Jan. 11, 2007; U.S. patent application Ser. No. 11/945,911 entitled "Group-Based Temporal Pooling," filed on Nov. 27, 2007; U.S. patent application Ser. No. 12/147,348 entitled "Hierarchical Temporal Memory System with Enhanced Inference Capability," filed on Jun. 27, 2008; and U.S. patent application Ser. No. 12/315,957 entitled "Action Based Learning," filed on Dec. 5, 2008, which are incorporated by reference herein in their entirety.

FIELD OF INVENTION

The present invention relates to a system for implementing Hierarchical Temporal Memory (HTM) network having an infrastructure that supports plugins for creating components of the HTM network.

BACKGROUND OF THE INVENTION

Hierarchical Temporal Memory (HTM) system represents a new approach to machine intelligence. In HTM systems, temporal sequences of patterns are presented to a network of nodes in training data. The HTM systems then build a model of the statistical structure inherent to the patterns and sequences in the training data, and thereby learns the underlying 'causes' of the temporal sequences of patterns and sequences in the training data. The hierarchical structure of the HTM systems allow them to build models of very high dimensional input spaces using reasonable amounts of memory and processing capacity.

FIG. 1 is a diagram illustrating a hierarchical nature of the HTM network where the HTM network 10 has three levels L1, L2, L3, with level L1 being the lowest level, level L3 being the highest level, and level L2 being between levels L1 and L3. Level L1 has nodes 11A, 11B, 11C and 11D; level L2 has nodes 12A and 12B; and level L3 has node 13. In the example of FIG. 1, the nodes 11A, 11B, 11C, 11D, 12A, 12B, and 13 are hierarchically connected in a tree-like structure such that each node has several children nodes (i.e., nodes connected at a lower level) and one parent node (i.e., node connected at a higher level). Each node 11A, 11B, 11C, 11D, 12A, 12B, and 13 may have or be associated with a capacity to store and process information. For example, each node 11A, 11B, 11C, 11D, 12A, 12B, and 13 may store sensed input data (e.g., sequences of patterns) associated with particular causes. Further, each node 11A, 11B, 11C, 11D, 12A, 12B, and 13 may be arranged to (i) propagate information "forward" (i.e., "up" an HTM hierarchy) to any connected parent node and/or (ii) propagate information "back" (i.e., "down" an HTM hierarchy) to any connected children nodes.

The nodes are associated or coupled to each other by links. A link represents logical or physical relationship between an output of a node and an input of another node. Outputs from a node in the form of variables are communicated between the nodes via the links. Inputs to the HTM 10 from, for example, a sensory system, are supplied to the level L1 nodes 11A-D. A sensory system through which sensed input data is supplied to level L1 nodes 11A-D may relate to various senses (e.g., touch, sight, sound).

The HTM network may be implemented on a system running on one or more computing devices. The system may be configured to operate in conjunction with various sensory systems and processing algorithms to efficiently learn structures in the input data in a training mode and determine cause of the data in an inference mode. In order to expand the applications of the HTM network, it is preferable to provide a system that can function with diverse types of components. Especially, the system for the HTM network should provide an environment in which diverse software and hardware components can be integrated. Such software and hardware components, for example, may be developed by different entities.

One way of affording flexibility to the system for the HTM is providing abstract interfaces for one or more of the components of the HTM network. For example, an abstract interface may be implemented using a base class using object-oriented programming languages (e.g., C++ and Java® (developed by Sun Microsystems, Inc. of Santa Clara, Calif.)). The abstract interface may be used for instantiating various components for the HTM.

SUMMARY OF THE INVENTION

Embodiments of the present invention provide a system, a method and a computer program product for implementing a hierarchical temporal memory (HTM) system that supports plugins. The plugin infrastructure registers the plugins to be used in creating (e.g., instantiating) the HTM network. The plugin may include one or more functions that may be invoked to create one or more components of the HTM network in software executables (e.g., runtime engine) for implementing the HTM network. After the plugin is registered, the plugin infrastructure allows functions of the plugin to be invoked to create or instantiate the HTM network on the runtime engine. After the HTM network is instantiated, the runtime engine may run the created HTM network to learn structures in the input data in a training mode and determine causes of the data in an inference mode.

In one or more embodiments, each plugin is associated with a component specification describing the properties of the components of the HTM network created (or instantiated) by invoking the function of the plugin. The properties of the component described in the component specification include, among others, the input of the component, the output of the component, commands that can be performed on the component, and configurable parameters. By referencing the descriptions in the component specification, the runtime engine or other programs operating in conjunction with the runtime engine may obtain information about the components which may be used to understand, debug, or configure the components of the HTM network.

In one or more embodiments, one or more external programs (tools) are operably coupled to and communicate with the runtime engine to provide support to various operations associated with the runtime engine. The tools may reference the component specification to perform the supporting operations. The supporting operations include, among others, validating a netlist defining the structure of the HTM network, building help information for the component, and providing a graphical user interface associated with the HTM network.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE FIGURES

The teachings of the present invention can be readily understood by considering the following detailed description in conjunction with the accompanying drawings.

DETAILED DESCRIPTION OF THE INVENTION

Figure 1:
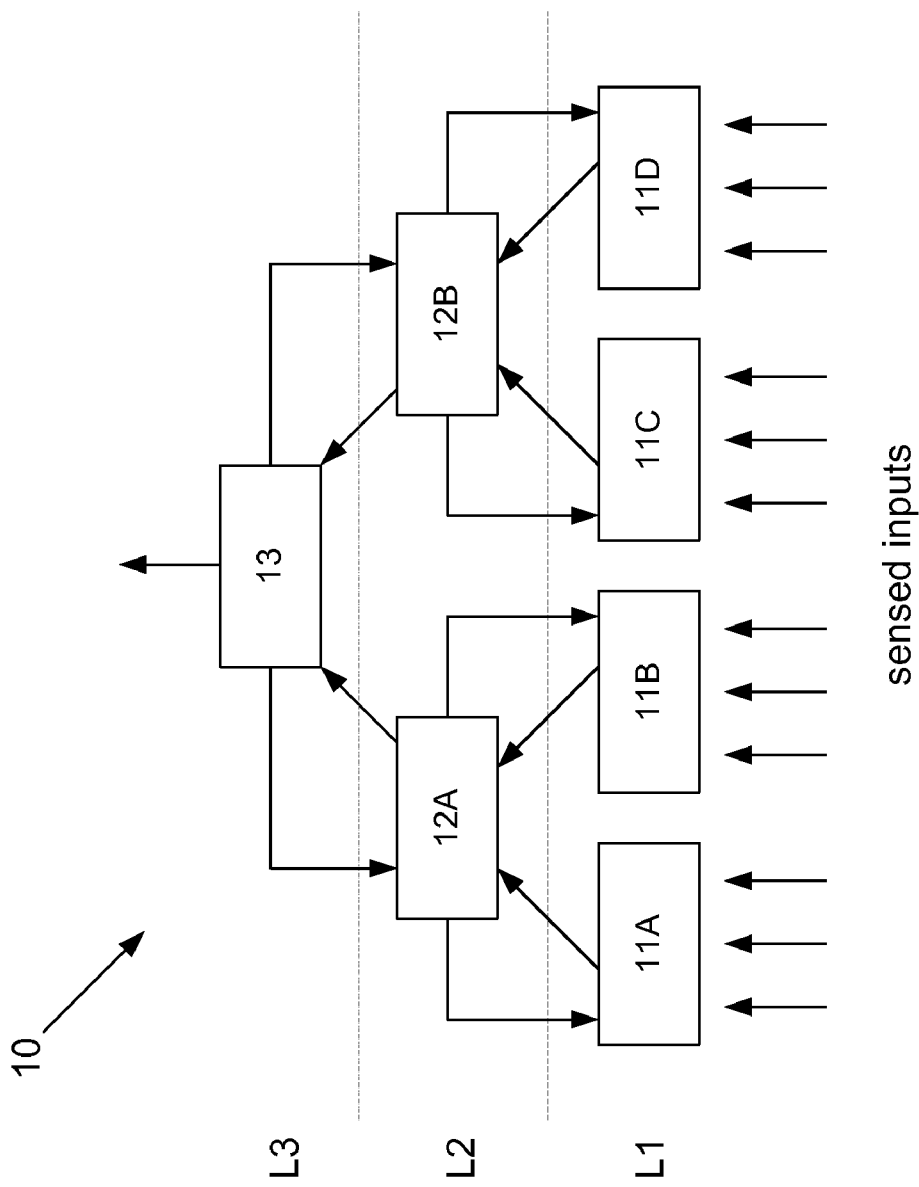
FIG. 1 is a schematic diagram illustrating a hierarchical temporal memory (HTM) network.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments provide a system for a hierarchical temporal memory (HTM) system that employs plugins to create components of the HTM network. The system includes software executables ("runtime engine") for implementing and running the HTM network. During the creation of the HTM network, the runtime engine invokes functions of the plugins to create instances of the HTM components. By using the plugins, the extensibility and flexibility of the system are enhanced. Each plugin may be associated with a component specification that describes properties of the HTM components (e.g., inputs, outputs, commands, and parameters) created by the plugin. The component specification can also be used by external applications ("tools") that function in conjunction with the runtime engine to perform various supporting operations including, among other operations, validation, generation of help information, and visualization of the HTM network.

Plugins are shared or dynamic software libraries that interact with the runtime engine and/or tools to provide functionality on demand. The functionality provided by the plugins includes, among others, instantiation of the HTM components in the runtime engine. The plugin may be codes written in object-oriented programming language (e.g., C++ and Java® (developed by Sun Microsystems, Inc. of Santa Clara, Calif.)) to define classes for the HTM components. The plugin includes a component specification describing the one or more components of the HTM network created (or instantiated) by invoking functions of the plugin.

The component specification refers to information related to the properties of the HTM components to be instantiated by the plugin. For example, the component specification may specify inputs, outputs, commands, and parameters of the nodes created by invoking a function in the plugin. The component specification may also identify the HTM components and describe conditions or constraints associated with the configuration of the HTM components.

The HTM components include, among others, nodes, filters, pre-processing components, and regions in the HTM network. The nodes of the HTM network build statistical model of the input data fed to the node in a training mode. In an inference mode subsequent to the training mode, the node generates an output based on the statistical model built during the training mode. The filters or pre-processing components may be attached to nodes to perform operations such as encryption, compression, translation and conversion of data. The regions refer to a set of nodes, filters, and processing components that may be treated and deployed as a single entity in the HTM network.

Architecture of the HTM System

Figure 2:
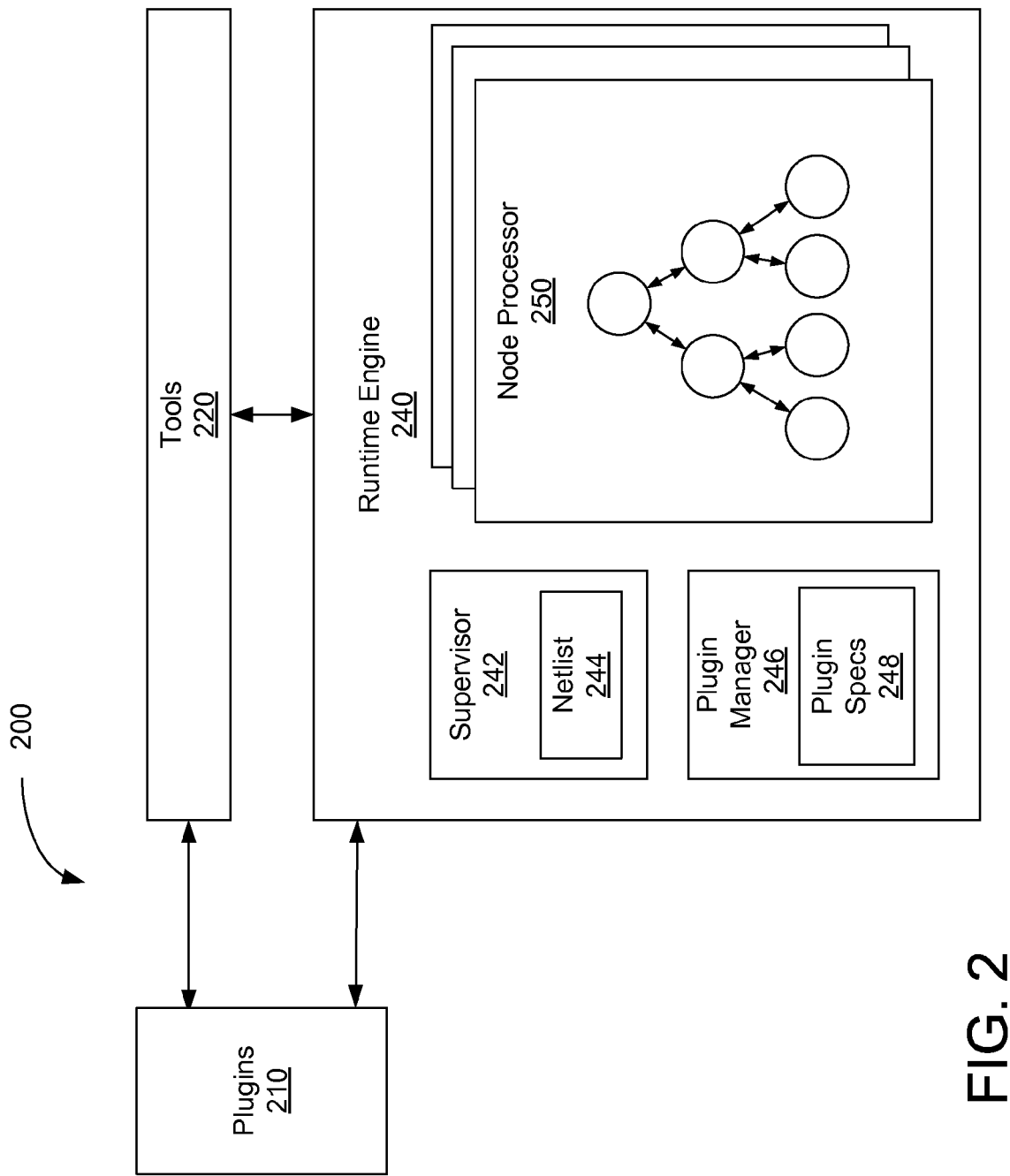
FIG. 2 is a block diagram illustrating the architecture of the HTM network employing a plugin infrastructure, according to one embodiment.

FIG. 2 is a block diagram illustrating the architecture of a HTM system 200 employing plugins, according to one embodiment. The HTM system 200 includes, among other components, plugins 210, tools 220, and a runtime engine 240. The plugins 210 include one or more plugins, as described below in detail with reference to FIG. 4. The tools 200 are applications external to the runtime engine 240 to provide various supporting operations associated with the HTM network, as described below in detail with reference to FIG. 3. The plugins 210, the tools 220, and the runtime engine 240 may be implemented on the same hardware device or on different hardware devices. In one or more embodiments, the tools 220 and the runtime engine 240 are implemented as described, for example, in U.S. patent application Ser. No. 11/351,437 entitled "Architecture of a Hierarchical Temporal Memory Based System," filed on Feb. 10, 2006, which is incorporated by reference herein in its entirety.

The runtime engine 240 is a set of software components that include, among other components, a supervisor 242, a plugin manager 246, and one or more node processors 250. The supervisor 242 is responsible for, among other operations, managing the operation of the one or more node processors 250 (e.g., creating the HTM network, starting the operation of the HTM network, and stopping the operation of the HTM network), and communicating with the tools 220. In one or more embodiments, the supervisor 242 stores a netlist 244 describing the structure of the HTM network to be implemented in the node processor 250. Specifically, the netlist 244 describes which HTM components are placed at which hierarchical levels, and how the HTM components are connected to each other. The netlist 244 may be built by the tools 220, as described below in detail with reference to FIG. 3.

The node processor 250 is a software component that is responsible for loading and running the HTM network as described by the netlist 244. In one embodiment, the node processor 250 manages one central processing unit (CPU). More than one node processor 250 may be used to run different portions of the HTM network on different CPUs. Specifically, each node processor 250 instantiates a portion of the HTM network as described in the portion of the netlist received from the supervisor 242.

The plugin manager 246 of the runtime engine 240 is a software component that manages operations associated with the plugins 210. For this purpose, the plugin manager 246 stores, among other information, the component specifications 248 of the plugins 210. The plugin manager 246 also performs, among other operations, loading of the plugins, initialization of the plugins, registering of the HTM components included in the plugins 210, creating of HTM components after receiving requests from the node processor 250, destroying of HTM components when not needed, and cleaning up and unloading of the plugins 210.

Figure 3:
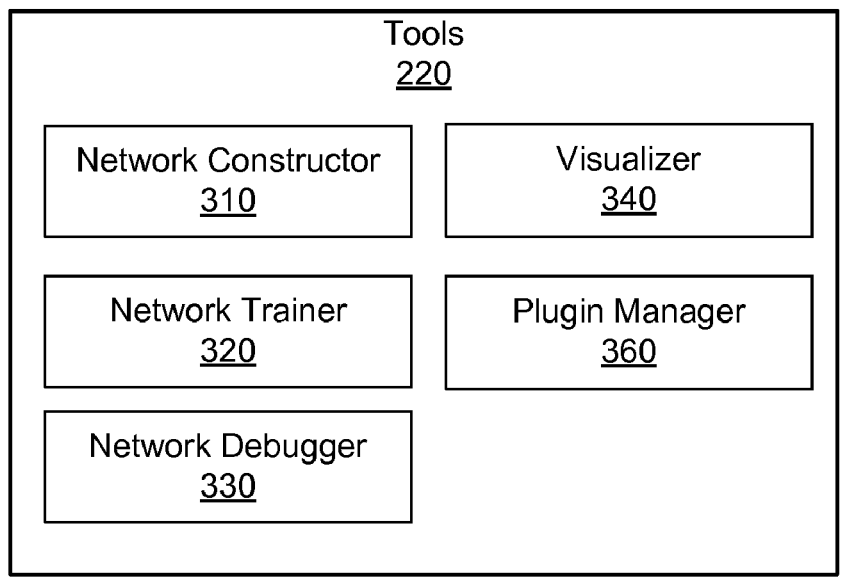
FIG. 3 is a block diagram illustrating components of tools associated with the runtime engine, according to one embodiment.

FIG. 3 is a block diagram illustrating the tools 220, according to one embodiment. The tools 220 may include various components that are specialized and devoted to specific supporting operations associated with the HTM network. The tools 220 include, for example, a network constructor 310, a network trainer 320, a network debugger 330, a visualizer 340, and the plugin manager 360. Each of these components, in conjunction with other components, may be implemented, for example, in software, hardware, firmware or any other combination thereof.

The network constructor 310 is accessed by the user to build a HTM network. Specifically, the network constructor 310 builds the netlist 244 that defines the structure of the HTM network. The network constructor 310 then sends the netlist 244 to the supervisor 242. The supervisor 242 analyzes the netlist 244 and sends relevant portions of the netlist 244 to one or more node processors 250. Each node processor 250 then instantiates the HTM network. The network constructor 310 may operate in conjunction with the visualizer 340 to provide a user-friendly interface to build and configure the HTM network.

The network trainer 320 is a tool component for training the HTM network constructed according to the netlist 244. In one embodiment, the network trainer 320 provides sample input data to the node processors 250 together with the correct classification of the sample input data to train the HTM network. Based on the sample input data and the correct classification, the HTM network builds statistical model of the input data.

The network debugger 330 operates in conjunction with the runtime engine 240 to resolve any issues encountered during configuration or running of the runtime engine 240. In one or more embodiments, the network debugger 330 captures states of the HTM components, and provides the states to the user for analysis. The network debugger 330 may operate in conjunction with the visualizer 340 to provide a display convenient for the user to understand and operate.

The visualizer 340 is a tool component that operates in conjunction with other components of the tools 220 to access information associated with the HTM network or manipulate the HTM network using a graphical user interface. The HTM network may include numerous components with complex structures, and may involve input data and output data that is difficult to comprehend based on raw information. The visualizer 340 may operate in conjunction with the runtime engine 240 or other tool components to build displays that allow users to readily understand, debug, or configure the HTM network, as described, for example, in detail below with reference to FIGS. 7-9.

The plugin manager 360 is a tool component that allows other tool components (e.g., network constructor 310) to perform operations associated with or in conjunction with the plugins 210. Like the plugin manager 248 of the runtime engine 240, the plugin manager 360 stores the component specifications of the plugins 210 that may be accessed by other tool components to support various operations associated with the plugins 210, as described below in detail.

In one or more embodiments, each component of the tools 220 is not provided as a separate software or hardware component but rather as a script that can be loaded and executed by a script interpreter. In one or more embodiments, the scripts are written in Python.

Figure 4:
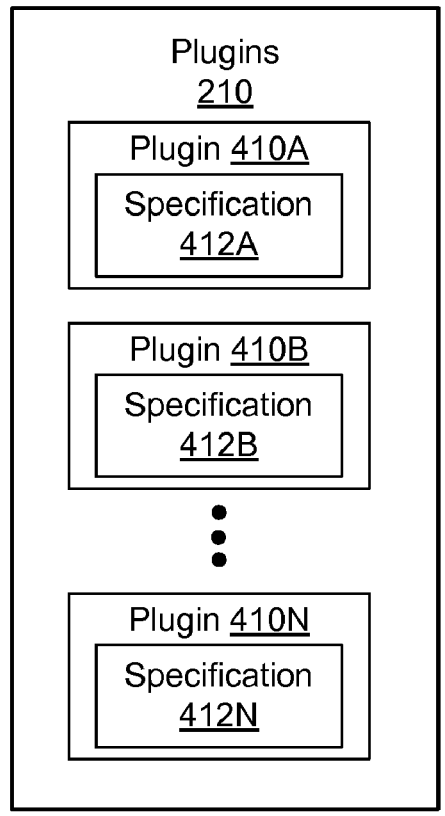
FIG. 4 is a block diagram illustrating plugins, according to one embodiment.

FIG. 4 is a block diagram illustrating the plugins, according to one embodiment. In the example of FIG. 4, each plugin 410A-N includes its component specification 412A-N. The component specification 412A-N defines the properties of all the HTM components that can be instantiated by invoking the functions in the plugins 410A-N.

Plugin Infrastructure

Using the plugin infrastructure has at least the following advantages: (i) convenient extension of the HTM network, (ii) environment allowing the user to pick and choose different components from various developers or vendors, (iii) program language independent designing for developers or vendors, and (iv) upgrade the HTM system while running. First, the plugins 210 allow extension of the HTM network to various applications without modifying or compiling codes of the runtime engine 240 or the tools 220. The plugins 210 may be added and registered conveniently with the runtime engine 240 and the tools 220. The runtime engine 240 or the tool components may then invoke the functions of the registered plugins "on demand." Second, the plugins 210 provide programming environment where the users can take advantage of HTM components developed by different developers or vendors. The users may obtain plugins 210 from various developers or vendors, and configure the HTM network to selectively incorporate the HTM components as defined in multiple plugins. Third, the plugin infrastructure allows the developers to use different programming languages to develop the HTM components. This allows the user to maximize the performance and application of the HTM network. Finally, using the plugins infrastructure is advantageous also because the HTM system may be upgraded while the HTM system is still running.

Each HTM component defined in the plugins may have different properties such as inputs, outputs, commands, and parameters. Further, each plugin may follow its own universe of convention to define and describe properties of its HTM components. Such convention, however, may not be apparent or visible to the user, the tools 220, the runtime engine 240 or other plugins. Therefore, in order to facilitate construction of a HTM network from the multiple plugins, a uniform scheme is needed to identify the HTM components and describe various properties of the HTM components in the plugin.

In one or more embodiments, the component specification provides a uniform scheme of describing the properties of the HTM components. Referring to FIG. 4, each plugin includes a component specification. The component specification is a set of metadata describing the properties of the HTM components that can be instantiated by invoking functions in the plugin. The component specification describes, among other properties, inputs, outputs, commands, and parameters of the HTM components. The component specification of a plugin is stored in the plugin managers 246, 360 during the registration process of the plugins to allow the tools 220 and/or the runtime engine 240 to reference the component specification without performing additional communication with the plugins 210. The stored component specification may then be accessed by the tools 220 or the runtime engine 240 for various purposes. For example, the component specification may be used to construct the HTM network, validate the HTM network described in the netlist 244, build help information associated with the HTM components, and visualize various aspects of the HTM network.

Building the HTM System Using Plugins

In one or more embodiments, the network constructor 310 accesses the component specifications to provide a user-friendly interface for constructing the HTM network. The network constructor 310, in conjunction with the visualizer 340, may implement a user interface (e.g., graphical user interface) that allows the user to select the HTM components, place the HTM components in certain hierarchical location, connect the HTM components, and configure the parameters for the HTM components. By referencing the component specifications, the network constructor 310 may provide information to the user concerning the properties and characteristics of the HTM components.

Figure 5:
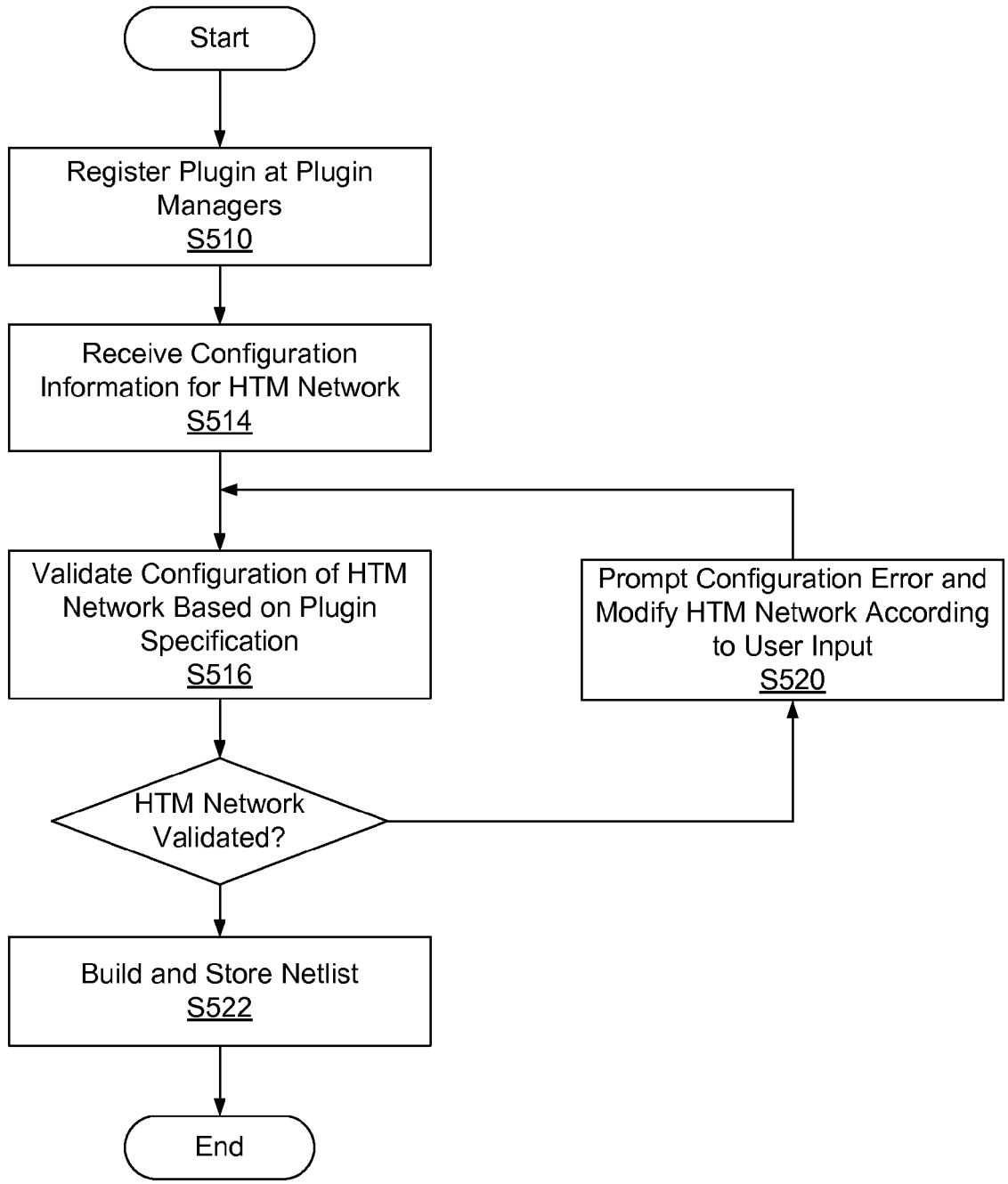
FIG. 5 is a flowchart illustrating a method of building a netlist using a component specification, according to one embodiment.

The component specifications may also be used for validating the netlist 244 during the construction of the HTM network. FIG. 5 is a flowchart illustrating the method of validating the netlist 244, according to one embodiment. First, the plugins 410A-N are registered S510 at the plugin manager 246 of the runtime engine 240 and the plugin manager 360 of the tools 220. The registration process includes reading the component specifications 412A-N from the plugins 410A-N, and storing the component specifications 412A-N in the plugin managers 246, 360. In one or more embodiments, entries are provided in the component specifications 412A-N to allow the plugin managers 246, 360 to determine whether the version of the HTM components in the plugin are compatible with the tools 220 and/or the runtime engine 240. If the plugin managers 246, 360 determine that the HTM components in the plugin are not compatible with the runtime engine 240 and/or the tools 220, the plugin managers 246, 360 may refuse to register the HTM components.

The user may then configure S514 the HTM network using the network constructor 310. During the configuration, the user may define the connections between the nodes, and set initial values of the parameters of the nodes. The HTM network as configured by the user, however, may include incorrect connections or settings that may result in a flawed or non-operational HTM network. Therefore, the configuration of the HTM network is validated S516 by checking against the component specifications stored in the plugin manager 360. Incorrect configurations of the HTM network include, among others, parameter values not set to a predefined range, coupling of a node output with an incompatible node input, and placing of a node at an incorrect hierarchical level of the HTM network.

If the HTM network is not validated, the configuration error is prompted S520 to the user. The user may then correct the HTM network by modifying the configuration. In one or more embodiments, the network constructor 310 suggests alternative configurations of the nodes that are likely to work. In another embodiment, the network constructor automatically corrects apparent errors in the configuration. Conversely, if the HTM network is validated, the netlist 244 is built S522 and stored in the supervisor 242.

Figure 6:
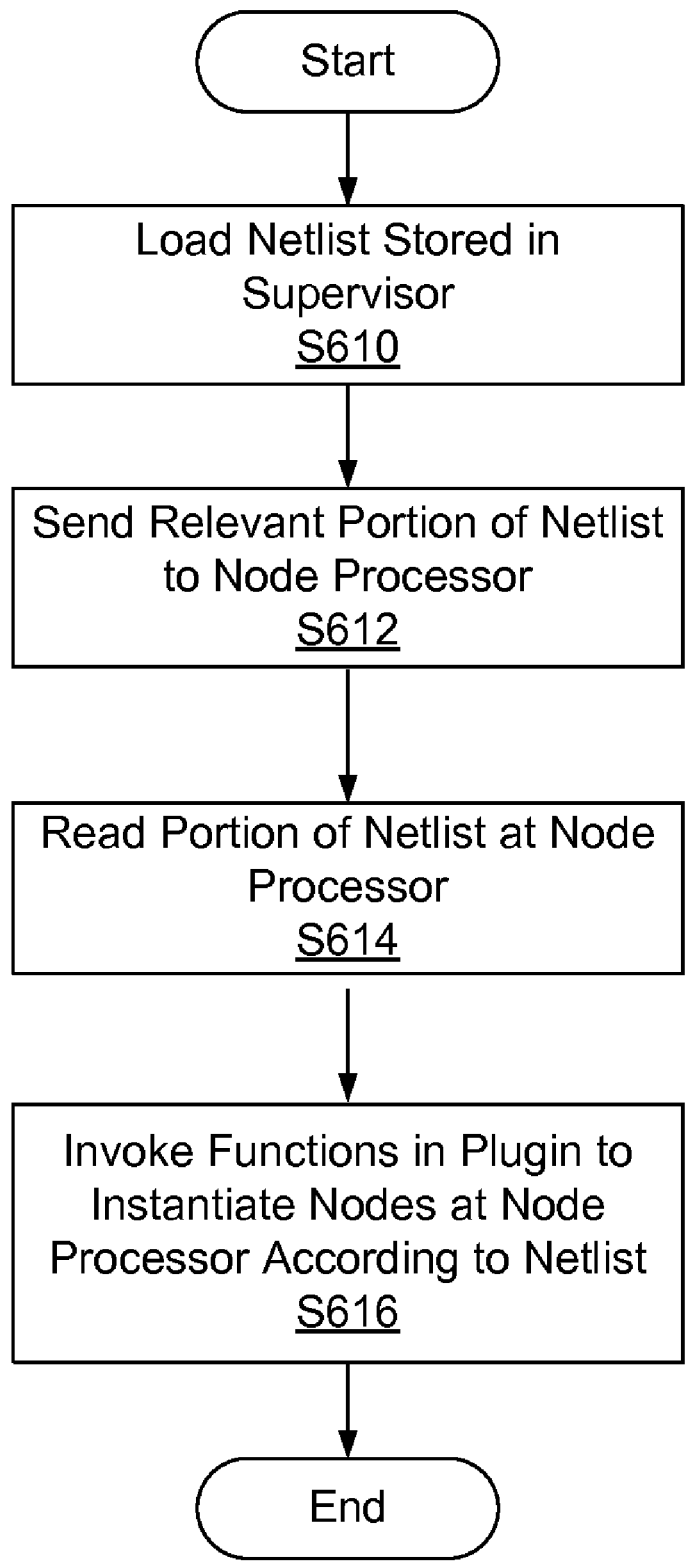
FIG. 6 is a flowchart illustrating a method of constructing a HTM network using the plugin, according to one embodiment.

FIG. 6 is a flowchart illustrating a method of constructing a HTM network using the plugins, according to one embodiment. First, the netlist 244 is loaded S610 onto the supervisor 242. The supervisor 242 may then send S612 the netlist 244 to the node processor 250. In one or more embodiments where the runtime engine 240 includes two or more node processors 250, the supervisor 242 may read the netlist 244 and send only portions of the netlist 244 relevant to each node processor.

At the node processor 250, the node processor reads S614 the netlist 244 (or a portion thereof) received from the supervisor 242. Then the node processor 250 invokes functions S616 from the plugins as described in the netlist 244 to instantiate nodes according to the netlist 244 (or a portion thereof). The instantiation of the nodes includes setting the connection of the nodes.

In one embodiment, the network constructor 310 automatically determines the parameters of the components or connection between the components based on the components specifications. For example, if a component specification of a HTM component describes a HTM component as requiring a feedback input from a higher level of the hierarchy, the network constructor 310 may automatically generate a netlist including a connection between the HTM component and a higher HTM component even when a user failed to add such connection. Furthermore, the network constructer 310 may automatically populate certain parameters based on the component specifications. For example, if a component specification requires a parameter of a HTM component to vary depending on the number of levels in the hierarchy, the network constructor 310 may automatically analyze the HTM network, determine the number of levels in the HTM network, and fill in the parameter of the HTM component.

Generation of Help Information from Component Specification

The component specifications may also be used to automatically generate help information associated with the HTM components. The plugin manager 360 of the tools 220 may read the component specifications, and generate the help information that describes the properties of the HTM components. Such help information may serve as a reference manual assisting the user to understand, debug, or configure the HTM components. Automatically generating the help information by the plugin manager is advantageous at least for the following reasons: (i) the plugin developers are relieved of the task of preparing separate help information for each HTM component included in the plugins; (ii) the help information for different plugins and HTM components may be in a consistent format, which allows the user to more easily obtain the information needed; and (iii) the plugin manager builds customized help information that includes only help information associated with certain HTM components and/or certain parameters of the HTM components as requested by the user.

Figure 7:
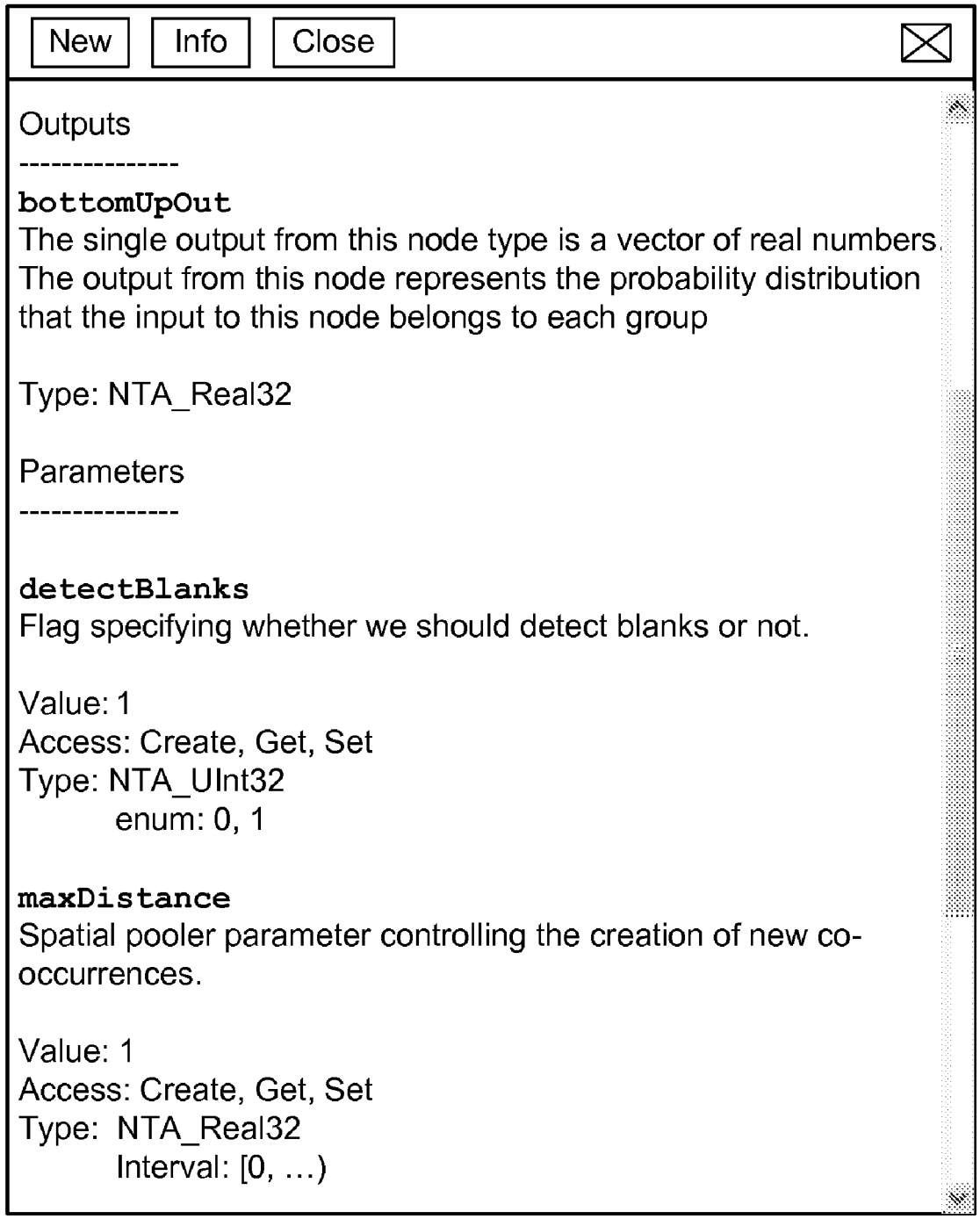
FIG. 7 is a display illustrating help information generated from a component specification, according to one embodiment.

FIG. 7 is an illustration of help information generated from a component specification, according to one embodiment. In the example of FIG. 7, help information describes an output (bottomUpOut) and two parameters (detectBlanks and maxDistance) of Zeta 1 node described below in detail. In one or more embodiments, the component specifications include flags identifying the portions of the descriptions to be included in the help information. The plugin manager 360 extracts only the flagged portions of the description to generate the help information.

In one or more embodiments, the help information for the plugins is generated automatically during the registration of the plugins. The help information are stored in the tools 222 and then provided to the user. In another embodiment, the help information for the HTM component is generated upon demand by the user. The help information for an HTM component is not generated beforehand but generated on demand from the user when the user requests help information about the HTM component.

In one or more embodiments, the user may customize the help information by identifying the parameters and/or the HTM component for which the information is requested. For example, the user may request the plugin manger 360 to generate help information only for outputs for all the HTM components. Also, the user may request help information for one parameter (e.g., "output 1") from a certain HTM component (e.g., "Zeta 1 node").

Visualization Using Component Specifications

Another use of the component specifications is to provide displays associated with configuration, debugging or running of the HTM network. In one embodiment, the component specifications are provided to the visualizer 340 to assist the visualizer 340 in generating displays associated with the HTM components. Having the information about the parameters of the HTM components, the visualizer 340 may interact with other components of the tools 220 to provide displays (e.g., histograms, pie charts, and progress bars) that facilitate the users to understand, analyze or modify the HTM network. By providing information about the properties of the HTM components to the visualizer 340, the visualizer 340 may interact with other tool components more efficiently. Further, the visualizer 340 may also provide displays structured according to the component specification.

Figure 8:
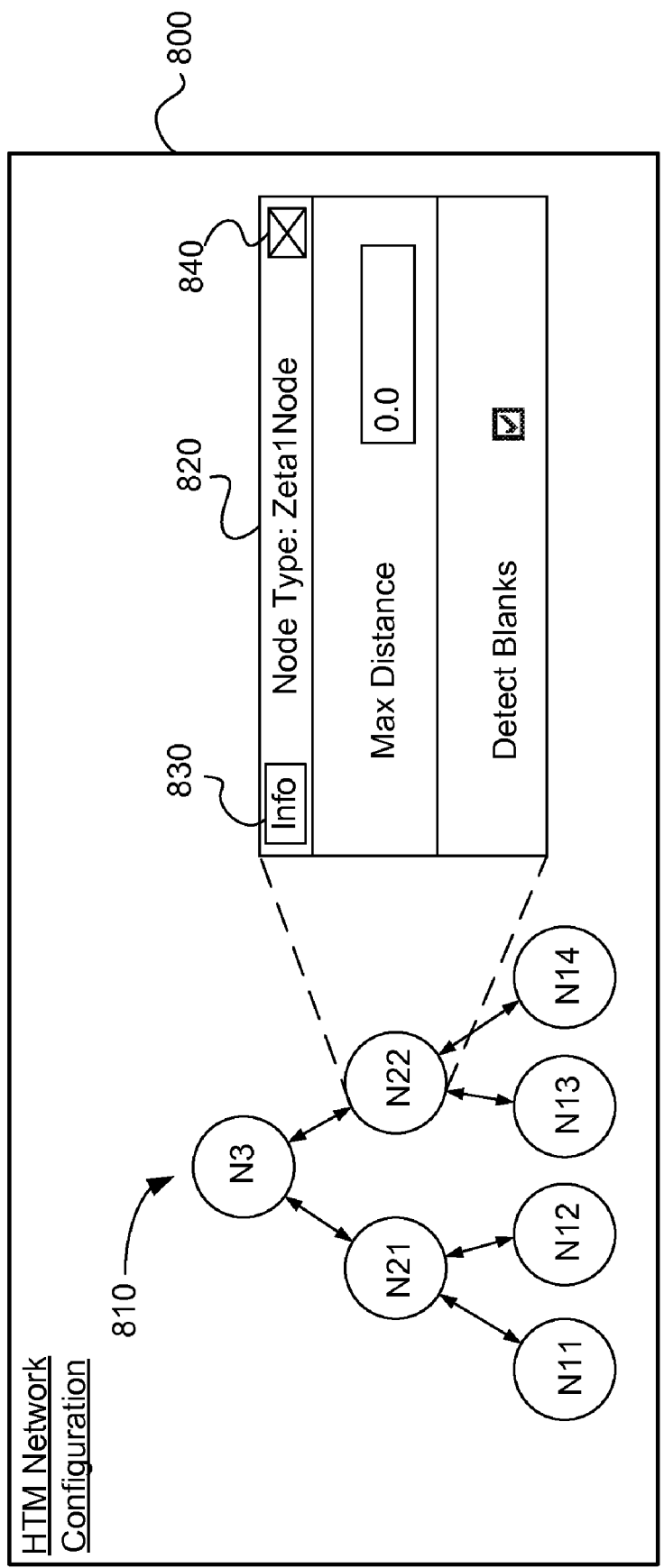
FIG. 8 is a display illustrating a graphical user interface for configuring the HTM network, according to one embodiment.

FIG. 8 is an illustration of a display provided by the visualizer 340 operating in conjunction with the network constructor 310 to configure the HTM network 810, according to one embodiment. In the example of FIG. 8, the HTM network 810 includes seven (7) nodes N11, N12, N13, N14, N21, N22, and N3. The seven (7) nodes may be instantiated, for example, using the method as described above with reference to FIG. 6. After the nodes N11, N12, N13, N14, N21, N22, and N3 are instantiated, the network constructor 310 operates in conjunction with the visualizer 340 to present the structure of the HTM network 810 to the user in a graphical user interface as illustrated in FIG. 8. Specifically, the visualizer 340 reads the netlist 244 and provides an image of the HTM network 810 showing nodes and their connections The visualizer 340 or the network constructor 310 also references the component specifications stored in the plugin manager 360 to obtain information about the parameters of the HTM components. In one or more embodiments, the visualizer 340 or the network constructor 310 reads the netlist 244 and determines which HTM components (e.g., node type) are included in the HTM network. Then the visualizer 340 or the network constructor 310 extracts the information regarding these HTM components from the component specifications so that the information about the configurable parameters for each HTM component may be provided to the user, for example, in the form of a window 820.

In the example of FIG. 8, when the user clicks a node of the HTM network 810, the user is presented with parameters of the node that are user-configurable. For example, when the user clicks node N22, the window 820 displayed on a screen 800 identifies what type of node it is (Zeta 1 node) and configurable parameters for the node N22 (i.e., maxDistance and detectBlanks). During the configuration, the user may click "info" icon 830 to access information regarding Zeta 1 node and its parameters. In response, the user may be presented with the help information, as described above in detail with reference to FIG. 7. After all of the parameters for node N22 are configured, the user may close the window 820 by clicking an icon 840. The same process of configuring the parameters may be repeated with other nodes N11, N12, N13, N14, N21, and N3. After parameters for all of the nodes are configured, the configuration information is sent to the runtime engine 240 to set the parameters of the nodes accordingly.

Although the example of FIG. 8 was described with reference to the network constructor 310, the visualizer 340 may also operate in conjunction with other components (e.g., network trainer 320 and network debugger 330) to visualize the parameters, operations or status of the HTM network 810.

Examples of Component Specifications

Example codes of the component specification are set forth below. These example codes are merely illustrative and various other codes may also be used. In the component specification describe below, the component specification includes lines describing the HTM component, input, outputs, commands, and parameters. The programming language used is C++.

```
typedef struct NTA_NodeSpec
{
    NTA_Byte * description;
    NTA_Size inputCount;
    NTA_InputSpec * inputs;
    NTA_Size outputCount;
    NTA_OutputSpec * outputs;
    NTA_Size commandCount;
    NTA_CommandSpec * commands;
    NTA_Size parameterCount;
    NTA_ParameterSpec * parameters;
} NTA_NodeSpec;
```

The above C struct defines the data structure of an illustrative component specification. The component specification in this example contains a global description string (description) describing a HTM node, and a list of items. The list of items include NTA_InputSpec, NTA_OutputSpec, NTA_CommandSpec and NTA_ParameterSpec defining the data structure for inputs, outputs, commands, and parameters associated with the HTM node, respectively, as described below in detail. The data structure also includes inputCount, outputCount, commandCount, and parameterCount items parameters used for validating the configuration of the HTM node, as described below in detail.

In one or more embodiments, the NTA_InputSpec struct describes a single input to a HTM node. Each input includes the parameters of one or more input ranges, a name (name), a type (type), and a description (description) as set forth in the following code:

```
typedef struct NTA_InputSpec
{
    const NTA_Byte * name;
    NTA_BasicType type;
    const NTA_Byte * description;
    NTA_UInt32 rangeCount; /* 0 means unlimited */
} NTA_InputSpec;
```

In one or more embodiments, the NTA_OutputSpec struct describes a single output. Each output of the HTM node includes the parameters of an output range, a name (name), a type (type), and a description (description) as set forth in the following code.

```
typedef struct NTA_OutputSpec
{
    const NTA_Byte * name;
    NTA_BasicType type;
    const NTA_Byte * description;
} NTA_OutputSpec;
```

In one or more embodiments, the NTA_CommandSpec struct includes descriptions for an execute( ) command. Each command has a name and a description of the command. In one or more embodiments, the parameters and return values of the command are not specified in the component specification. A code illustrating the data structure of the NTA_CommandSpec is provided below.

```
typedef struct NTA_CommandSpec
{
    const NTA_Byte * name;
    NTA_BasicType type;
} NTA_CommandSpec;
```

In one or more embodiments, the NTA_ParameterSpec may be used by the tools 220 to get or set parameters of the HTM nodes. The parameters may also be used for initializing a node after creating an untrained HTM network. In one or more embodiments, the NTA_ParameterSpec describes a single parameter, each having has a name (name), an element count (elementCount), a description (description), an access field (access) and a default value (defaultValue) as set forth below:

```
typedef struct NTA_ParameterSpec
{
    const NTA_Byte * name;
    NTA_BasicType type;
    NTA_UInt32 elementCount;
    const NTA_Byte * description;
    const NTA_Byte * constraints;
    const NTA_Byte * defaultValue; /*NULL means the
parameter is required*/
    NTA_UInt32 access;
} NTA_ParameterSpec;
```

The elementCount in the above code allows parameters to contain arrays of basic types of data specified by the type field. If elementCount is 0, any number of elements is acceptable. The constraints field in the above code includes declarative statements constraining the value that can be taken by the parameters. The access field describes when the parameter may be accessed. The access field may have four values representing four different flags: GET, SET, CREATE-STATE and ALL. When the access field is GET, the parameter may be accessed for queries, but the parameter may not be set to an existing value or a different value. When the access field is SET, the parameters may be accessed for setting or modification. When the access field is CREATE_STATE, the parameter may be accessed to set the initial state of the node. When the access field is set to ALL, the parameter may be accessed for queries, for setting/modification, and for setting the initial state of the node.

In another embodiment, the data structure of the component specification is defined using a memory-managed data structure instead of C struct. By using the memory-managed data structure, memory for the component specification structures and strings can be mapped in from the text portion of plugin code. Using the memory-managed data structure is advantageous because the component specification can be made dynamic without much additional support.

The following code is an illustrative component specification of a node in the HTM network called "Zeta 1" node, according to the nested C struct described above in the illustrative codes. The Zeta 1 node may be placed between the bottom node and top node to learn statistical model of sample input data, and then perform inference on the received data. The component specification of the Zeta 1 node provided below, however, is simplified for the sake of explanation and does not include all the commands and parameters necessary for the actual operation.

```
// ------ OUTPUTS
    ns.outputCount = 1;
    ns.outputs = &ns.outputs__[0];
    ns.outputs[0].name = "bottomUpOut";
    ns.outputs[0].type = NTA__BasicType__Real;
    ns.outputs[0].description = "The single output from this
node type is a vector of reals. It represents the probability
distribution that the input to this node belongs to each
group.\n";
// ------ INPUTS
    ns.inputCount = 1;
    ns.inputs = &ns.inputs__[0];
    ns.inputs[0].name = "bottomUpIn";
    ns.inputs[0].type = NTA__BasicType__Real;
    ns.inputs[0].description = "Inputs from children nodes.
There are as many input vectors as there are children to this
node. Each input from a child is a vector of reals. It
represents, for each child, the probability distribution over
its groups that the child's input belongs to those
groups.\n";
    ns.inputs[0].rangeCount = 0;
// ------ COMMANDS
    ns.commandCount = 1;
    ns.commands = &ns.commands__[0];
    int c = -1;
    ns.commands[++c].name = "setLearning";
    ns.commands[c].description = "setLearning <0|1> Turn
learning on or off. Default is on. In ZetaNode turning off
learning has the side effect of turning on inference.\n";
// Number of commands corresponds to commandCount?
    NTA__CHECK(((unsigned int) c+1)==ns.commandCount) <<
"Error in nodespec: Command count does not match number of
commands.";
// ------ PARAMETERS
    ns.parameterCount = 2;
    ns.parameters = &ns.parameters__[0];
    c = -1;
    ns.parameters[++c].name = "detectBlanks";
    ns.parameters[c].elementCount = 1;
    ns.parameters[c].type = NTA__BasicType__UInt32;
    ns.parameters[c].description = "Flag specifying whether
we should detect blanks or not.";
```

-continued

```
    ns.parameters[c].access = NTA__ParameterAccess__ALL;
    ns.parameters[c].constraints = "enum: 0, 1";
    ns.parameters[c].defaultValue = "1";
    ns.parameters[++c].name = "maxDistance";
    ns.parameters[c].type = NTA__BasicType__Real;
    ns.parameters[c].description = "Spatial pooler parameter
controlling the creation of new coincidences.";
    ns.parameters[c].access = NTA__ParameterAccess__ALL;
    ns.parameters[c].constraints = "interval: [0, ...)";
    ns.parameters[c].defaultValue = "0";
// Number of parameters corresponds to parameterCount?
    NTA__CHECK(((unsigned int) c+1)==ns.parameterCount) <<
"Error in nodespec: Parameter count does not match."
```

NTA_CHECK function is used to validate whether the number of properties (output, input, command, and parameter) listed in the component specification coincides with the number of properties described in the preamble (ns.outputCount=1, ns.inputCount=1, ns.commandCount=1, and ns.parameterCount=2).

In one or more embodiments, the component specification allows grouping and bundling of parameters and commands. In the following example code for a node called "Alpha 1," the parameters are grouped into two distinct groups: (i) temporal pool parameters including "Top Neighbors" and "Max Group Size", and (ii) spatial pool parameters including "Sigma" and "Pool Algorithm." These two groups are identified by ns.parameters[c].group.

```
// ------ PARAMETERS
    ns.parameterCount = 4;
    ns.parameters = &ns.parameters__[0];
    c = -1;
    ns.parameters[++c].name = "Top Neighbors";
    ns.parameters[c].group = "Temporal Pool Parameters";
    ns.parameters[c].type = NTA__BasicType__UInt32;
    ns.parameters[c].description =
        "Temporal pooler parameter specifying how many neighbor
coincidences to consider for grouping.";
    ns.parameters[c].access = NTA__ParameterAccess__ALL;
    ns.parameters[c].constraints = "interval: (0, ...)";
    ns.parameters[++c].name = "Max Group Size";
    ns.parameters[c].group = "Temporal Pool Parameters";
    ns.parameters[c].type = NTA__BasicType__UInt32;
    ns.parameters[c].description =
        "Temporal pooler parameter specifying how large groups
can be.";
    ns.parameters[c].access = NTA__ParameterAccess__ALL;
    ns.parameters[c].constraints = "interval: (0, ...)";
    ns.parameters[++c].name = "sigma";
    ns.parameters[c].group = "Spatial Pool Parameters";
    ns.parameters[c].type = NTA__BasicType__Real;
    ns.parameters[c].description =
        "Spatial pooler parameter, the standard deviation of
normal distributions in gaussian mode.";
    ns.parameters[c].access = NTA__ParameterAccess__ALL;
    ns.parameters[c].constraints = "interval: (0, ...)";
    ns.parameters[c].defaultValue = "0.40824829047";
    ns.parameters[++c].name = "Pool Algorithm";
    ns.parameters[c].group = "Spatial Pool Parameters";
    ns.parameters[c].type = NTA__BasicType__BytePtr;
    ns.parameters[c].description = "dot - 0, product - 1,
gaussian - 2, dot__maxD - 3, product__maxD - 4";
    ns.parameters[c].access = NTA__ParameterAccess__ALL;
    ns.parameters[c].constraints = "enum: dot, product,
gaussian, dot__maxD, product__maxD, 0, 1, 2, 3, 4";
```

Figure 9:
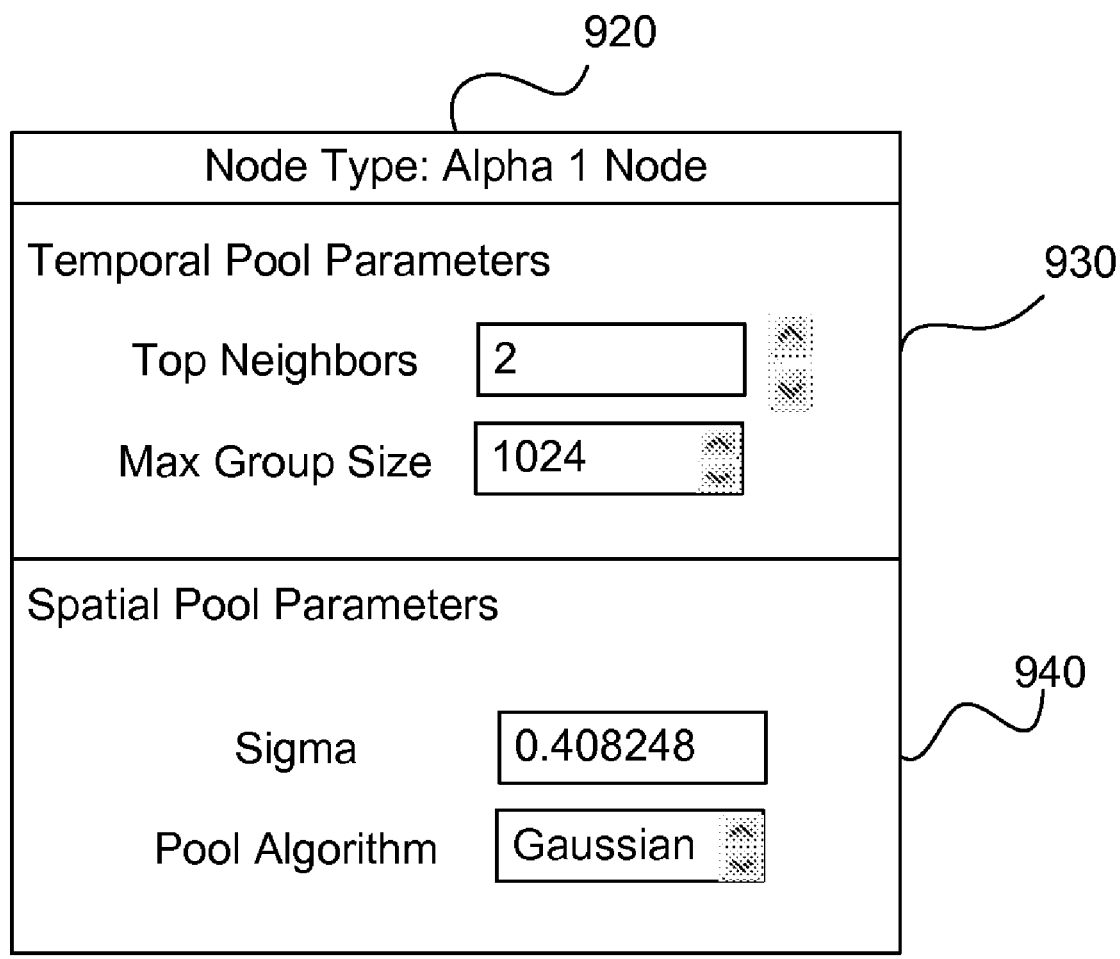
FIG. 9 is a display illustrating another graphical user interface for configuring the HTM network, according to one embodiment.

FIG. 9 is a diagram illustrating a window 920 for configuration of Alpha 1 node, as described in the above component specification. By using the information described in ns.parameters[c].group, the visualizer 340 can display related parameters in the same box 930, 940. This allows the user to more easily understand the relationship between the parameters of Alpha 1 node. In one or more embodiments, commands, inputs, and outputs of the nodes are also grouped and bundled.

Although examples of the component specification are described above using nested C structs, the component specification may also be described in other formats including text-based representations such as XML (Extensible Markup Language) or a custom domain specific language. An advantage of the text-based representations of the component specification is that it is more convenient for plugin developers to create and modify the component specification.

In another embodiment, the grouping of parameters is achieved by using a naming convention instead of using a separate field indicating the group. Specifically, a dot (".") or other punctuation marks are used in the code to distinguish between the name of the group and the name of the parameter. For example, a parameter described as "Temporal_Pool_Parameters. Top_Neighbors" indicates that the group is "Temporal_Pool_Parameters" and the name of the parameter is "Top_Neighbors." Another parameter described as "Temporal_Pool_Parameters. Max_Group_Size" indicates that the group is also "Temporal_Pool_Parameters" and the name of the parameter is "Max_Group_Size." In these examples, the group to which the parameters belong can be determined from the naming description of the parameter.

ALTERNATIVE EMBODIMENTS

In one or more embodiments, the component specification is not included in the plugin. Instead, the component specification is provided in a file separate from the plugin. The plugins, for example, may indicate a code indicating which file includes the component specification for the plugin. In another embodiment, the component specification for multiple plugins may be provided in a single file. In yet another embodiment, the component specification is provided in multiple files. Each component specification may describe only certain properties of the plugin.

Further, multiple component specifications may be associated with a single plugin. For example, a component specification may include descriptions only for commands of the plugins, and another component specification may include descriptions only for parameters of the plugins.

In one or more embodiments, the HTM components may be dynamic. That is, the HTM components may be automatically constructed based on dynamic conditions and environment in which the HTM components are being deployed. The component specification associated plugins instantiating such dynamic HTM components may also be dynamic. The component specification for plugins may be created when the dynamic HTM components are created or instantiated.

In one embodiment, the component specifications support version control and help implement backward compatibility between the HTM component and the tools 220, the runtime engine 240 or other HTM components. Some HTM components may not be compatible with certain versions of the runtime engine 240, the tools 220 or other HTM components. The component specification may be referenced to determine such incompatibility of the HTM component. For example, the component specification may indicate the versions of the tools 220 or the runtime engine 240 that the HTM component is compatible with. Based on such information, certain features of the runtime engine 240, the tools 220 or other HTM components may be disabled. Alternatively, adapters or other interfacing tools may be deployed based on the component specification to allow the HTM component to interoperate with the runtime engine 240, the tools 220 or other HTM components.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A system comprising a processor for implementing a hierarchical temporal memory (HTM) network, the system further comprising:
    a plugin including a function for creating a component of the HTM network;
    a component specification associated with the plugin, the component specification describing properties of the component; and
    a runtime engine operably coupled to the plugin, the runtime engine invoking the function of the plugin to create an instance of the HTM network, the runtime engine running the instance of the HTM network to learn and infer the causes of input data.

2. The system of claim 1, wherein the properties of the component described in the component specification comprise an input of the component, an output of the component, a command that can be performed on the component, and a parameter that is configurable by a user.

3. The system of claim 1, further comprising one or more tools operably coupled to the runtime engine to support operations associated with the runtime engine by referencing the component specification.

4. The system of claim 3, wherein the one or more tools comprise a network constructor building a netlist defining a structure of the HTM network, the network constructor validating the netlist by confirming whether properties of the component described in the netlist comply with descriptions of the properties in the component specification.

5. The system of claim 3, wherein the one or more tools comprise a plugin manager for building help information for the component by extracting descriptions associated with the component from the component specification.

6. The system of claim 3, wherein the one or more tools comprise a visualizer for providing a graphical user interface associated with the HTM network by referencing the component specification.

7. The system of claim 3, wherein the network constructor automatically sets parameters or connections of the component based on the component specification.

8. The system of claim 1, wherein the runtime engine comprises a plugin manager for supporting operations associated with the plugin.

9. The system of claim 1, wherein the component specification includes version information for determining compatibility with other parts of the system.

10. A computer-implemented method of managing a hierarchical temporal memory (HTM) network, comprising:
    at a computing device, registering a plugin including a function for creating a component of the HTM network on a runtime engine, the plugin associated with a component specification describing properties of the component;
    instantiating the HTM network by invoking the function of the registered plugin; and running the instance of the HTM network to learn and infer causes of input data received at the instance of the HTM network.

11. The computer-implemented method of claim 10, wherein the properties of the component described in the component specification comprise an input of the component, an output of the component, a command that can be performed on the component, and a configurable parameter.

12. The computer-implemented method of claim 10, further comprising one or more tools communicating with the runtime engine to provide supporting operations for the runtime engine, the one or more tools referencing the component specification.

13. The computer-implemented method of claim 10, further comprising:
   at a network constructor, building a netlist defining a structure of the HTM network, the runtime engine instantiating the HTM network according to the netlist; and
   at the network constructor, validating the netlist by confirming whether the properties of the component described in the netlist comply with descriptions in the component specification.

14. The computer-implemented method of claim 13, further comprising the automatically setting parameters or connections of the component based on the component specification.

15. The computer-implemented method of claim 10, further comprising building help information for the component by extracting descriptions associated with the component from the component specification.

16. The computer-implemented method of claim 10, further comprising providing a graphical user interface associated with the HTM network by referencing the component specification.

17. The computer-implemented method of claim 10, further comprising determining compatibility of the component with the runtime engine based on the component specification.

18. A non-transitory computer readable storage medium structured to store instructions executable by a processor, the instructions, when executed cause the processor to:
   register a plugin including a function for creating a component of a hierarchical temporal memory (HTM) network on a runtime engine, the plugin associated with a component specification describing properties of the component;
   instantiate the HTM network by invoking the function of the registered plugin; and
   run the instance of the HTM network to learn and infer causes of input data received at the instance of the HTM network.

19. The computer readable storage medium of claim 18, wherein the properties of the component described in the component specification comprise an input of the component, an output of the component, a command that can be performed on the component, and a parameter that is configurable by a user.

20. The computer readable storage medium of claim 18, further comprising instructions to:
   build a netlist defining a structure of the HTM network; and
   validate the netlist by confirming whether the properties of the component described in the netlist comply with descriptions in the component specification.

* * * * *